United States Patent
Jordy et al.

(10) Patent No.: US 11,670,798 B2
(45) Date of Patent: Jun. 6, 2023

(54) SOLID ELECTROLYTE FOR A LITHIUM-ION ELECTROCHEMICAL CELL

(71) Applicants: SAFT, Levallois-Perret (FR); UNIVERSITE PARIS-EST CRETEIL VAL DE MARNE (UPEC), Creteil (FR); Centre National de la Recherche Scientifique (CNRS), Paris (FR)

(72) Inventors: Christian Jordy, St Louis de Montferrand (FR); Pedro Lopez-Aranguren, Madrid (ES); Ha Anh Dao, Hanoi (VN); Michel Latroche, L'Hay les Roses (FR); Junxian Zhang, Lardy (FR); Fermin Cuevas, Lardy (FR)

(73) Assignees: SAFT, Levallios-Perret (FR); UNIVERSITE PARIS-EST CRETEIL VAL DE MARNE UPEC, Creteil (FR); Center National de la Recherche Scientifique (CRNS), Paris (FR)

( * ) Notice: Subject to any disclaimer, the term of this patent is extended or adjusted under 35 U.S.C. 154(b) by 463 days.

(21) Appl. No.: 16/648,329

(22) PCT Filed: Sep. 20, 2018

(86) PCT No.: PCT/EP2018/075516
§ 371 (c)(1),
(2) Date: Mar. 18, 2020

(87) PCT Pub. No.: WO2019/057840
PCT Pub. Date: Mar. 28, 2019

(65) Prior Publication Data
US 2020/0227776 A1   Jul. 16, 2020

(30) Foreign Application Priority Data

Sep. 22, 2017 (FR) .................... 17 58 782

(51) Int. Cl.
*H01M 10/0562* (2010.01)
*C01B 6/24* (2006.01)
(Continued)

(52) U.S. Cl.
CPC ......... *H01M 10/0562* (2013.01); *C01B 6/246* (2013.01); *H01M 10/0525* (2013.01);
(Continued)

(58) Field of Classification Search
None
See application file for complete search history.

(56) References Cited

U.S. PATENT DOCUMENTS

2016/0156064 A1   6/2016   Miyashita et al.

OTHER PUBLICATIONS

Sylvain Boulineau et al., "Mechanochemical synthesis of Li-argyrodite Li6PS5X (X=Cl, Br, I) as sulfur-based solid electrolytes for all solid state batteries application", Solid State Ionics, 2012, pp. 1-5, vol. 221.

(Continued)

*Primary Examiner* — Eli S Mekhlin
(74) *Attorney, Agent, or Firm* — Sughrue Mion, PLLC

(57) ABSTRACT

The invention relates to a compound of the formula $Li_{7-x}PS_{6-x}X_{x-z}(BH_4)_z$, in which x is selected from the group comprising Cl, Br, I, F and CN, $0 \leq x \leq 2$, $0 \leq z \leq 0.50$. This compound can be used as a solid electrolyte of a lithium-ion electrochemical element.

15 Claims, 4 Drawing Sheets

(51) Int. Cl.
H01M 10/0525 (2010.01)
H01M 10/0585 (2010.01)

(52) U.S. Cl.
CPC ..... *H01M 10/0585* (2013.01); *C01P 2002/02* (2013.01); *C01P 2002/72* (2013.01); *C01P 2006/40* (2013.01); *H01M 2300/0068* (2013.01)

(56) References Cited

OTHER PUBLICATIONS

Akihiro Yamauchi et al., "Preparation and ionic conductivities of $(100-x)(0.75Li_2S.0.25P_2S_5).XLiBH_4$ glass electrolytes", Journal of Power Sources, 2013, pp. 707-710, vol. 244.

Atsushi Unemoto et al., "Fast lithium-ionic conduction in a new complex hydride-sulphide crystalline phase", Chemical Communications, Nov. 6, 2015, pp. 564-566, vol. 52, No. 3.

International Search Report for PCT/EP2018/075516 dated Nov. 21, 2018 [PCT/ISA/210].

SOLID ELECTROLYTE FOR A LITHIUM-ION ELECTROCHEMICAL CELL

CROSS REFERENCE TO RELATED APPLICATIONS

This application is a National Stage of International Application No. PCT/EP2018/075516 filed Sep. 20, 2018, claiming priority based on French Patent Application No. 17 58 782 filed Sep. 22, 2017.

TECHNICAL FIELD

The technical field of the invention is that of inorganic solid electrolytes for lithium or lithium-ion electrochemical cells. The technical field is also that of processes for preparing such inorganic solid electrolytes.

PRIOR ART

Rechargeable lithium-ion electrochemical cells are known in the prior art. Because of their high mass and volume energy density, they are a promising source of electrical energy for portable electronic devices, electric and hybrid vehicles, and stationary electricity storage systems. However, these cells frequently contain an organic liquid electrolyte which, in the event of thermal runaway of the cell, reacts exothermically with the active materials of the negative and positive electrodes, and in some cases the cells may catch fire, posing a safety risk to the user.

Rechargeable lithium-ion electrochemical cells with a solid electrolyte offer a solution to this risk of thermal runaway. By using a solid electrolyte, the exothermic reaction between the active materials and the electrolyte is suppressed, which considerably improves safety for the user. The solid electrolyte can be an inorganic compound.

One of the main advantages of inorganic solid electrolytes is that they are generally conductors of only one type of ions, here the $Li^+$ cation, which is therefore exchanged with the active materials for electrochemical reactions. Few organic polymers used as solid electrolyte behave in the same way and when they do, their resistivity is greatly increased. Therefore, only $Li^+$ ions are mobile for inorganic electrolytes. The other ions, anions and cations, are immobile. The lithium transport number is 1 (or tends towards 1); this characteristic makes it possible to suppress the phenomena of ionic diffusion of the electrolyte, which improves performance at fast regimes. Furthermore, the inorganic electrolytes make it impossible for chemical species to migrate through the thickness of the separator, which considerably reduces self-discharge phenomena. Solid electrolytes extend the choice of electrode materials and can extend the potential window. However, the electronic conductivity must be less than $10^{-12}$ S/cm to accept storage for several months.

Another consideration in the choice of an inorganic solid electrolyte is the resistance of the inorganic solid electrolyte at the electrode interface because this interface resistance is just as important and is often as great as the resistivity of the electrolyte. For this reason, the contact resistance of particles to electrolyte particles must also be taken into consideration if the material is powdered and not only that of the core. Generally, the resistance associated with ion-exchange through the passivation layer (SEI) formed on the surface of the negative electrode will be higher than that of a liquid electrolyte or a polymer that is susceptible to deformation.

Work on highly conductive amorphous (glass) solid electrolytes based on lithium sulfide $Li_2S$, $SiS_2$, $P_2S_5$ and $B_2S_3$ was reported as early as the early 1980s.

The document J. Amer. Ceram. Soc. 84 (2001) 477 describes manufacture by planetary grinding followed by compression of a mixture comprising 75 mol % $Li_2S$ and 25 mol % $P_2S_5$. This mixture has an ionic conductivity at 25° C. of 200 µS/cm.

It is also known to use as solid electrolyte a lithium-ion electrochemical cell a $Li_6PS_5X$ compound of the argyrodite type where X denotes a halogen atom. This type of compound is obtained by reacting $Li_2S$ with $P_2S_5$ and with a lithium halide LiX.

The document JP 2016-134316 describes a solid electrolyte which is a mixture of a first sulfur-based compound, e.g. $Li_6PS_5X$, and a second compound which is a solid solution of $LiX$-$LiBH_4$ where X is a halogen. In this document, it is described that the particles of solid solution of $LiX$-$LiBH_4$ fill the voids between the particles of the sulfur-based compound. The process for manufacturing the solid electrolyte of document JP 2016-134316 is carried out in several steps:
  a first step of grinding a mixture containing $Li_2S$, $P_2S_5$ and LiX to form a $Li_6PS_5X$ compound of the argyrodite type;
  a second step of forming a solid solution of $LiX$-$LiBH_4$;
  a third step of mixing the products from the first step and from the second step. It can be noted that this preparation process does not allow the incorporation of $BH_4^-$ ions into the structure of the $Li_6PS_5X$ compound.

The document EP-A-3 043 411 describes an electrochemical cell comprising a solid electrolyte. The solid electrolyte may consist of the superposition of two layers of different compositions. The first layer may comprise a material based on $Li_2S$—$P_2S_5$. The second layer comprises a material that is a solid solution of $LiX$-$LiBH_4$. As in the document JP 2016-134316, $BH_4^-$ ions are not incorporated into the structure of the $Li_2S$—$P_2S_5$-based material.

Novel compounds are being sought that can be used as the solid electrolyte of a lithium-ion electrochemical cell.

A solid electrolyte with improved ionic conductivity is also sought.

SUMMARY OF THE INVENTION

To this end, the invention proposes a compound of formula $Li_{7-x}PS_{6-x}X_{x-z}(BH_4)_z$ wherein:
  X is selected from the group consisting of Cl, Br, I, F and CN;
  $0 < x \leq 2$;
  $0 < z \leq 0.50$.

This compound is characterized by a partial substitution of the halide ion $X^-$ by the borohydride ion $BH_4^-$. It has a higher ionic conductivity than the compound $Li_{7-x}PS_{6-x}X_x$ wherein the halide $X^-$ is unsubstituted. The ionic conductivity can be multiplied by a factor of up to 7 when X is I and the substitution rate is about 17%. The use of the compound according to the invention as solid electrolyte of a lithium-ion electrochemical cell reduces the internal resistance of the cell and enables the cell to provide a higher discharge voltage for a given discharge regime.

According to an embodiment, $x=1$.
According to an embodiment, X is I or Cl.
According to an embodiment, $0.1 \leq z \leq 0.35$.
According to an embodiment, $0.1 \leq z \leq 0.20$.
According to an embodiment, $0.15 \leq z \leq 0.20$.

According to an embodiment, the compound is in amorphous form.

The invention also relates to a process for preparing the compound, said process comprising the steps of:

a) providing a mixture comprising $Li_2S$, $P_2S_5$, $LiBH_4$ and LiX wherein X is selected from the group consisting of Cl, Br, I, F and CN;

b) grinding the mixture for a period of time sufficient to allow the incorporation of $LiBH_4$ into the compound $Li_{7-x}PS_{6-x}X_{x-z}(BH_4)_z$.

According to an embodiment, the grinding step b) is carried out for a period of at least 15 hours, preferably at least 20 hours.

The invention also relates to an electrochemical cell comprising a solid electrolyte comprising the compound as described above.

According to an embodiment, the solid electrolyte does not contain $LiBH_4$.

According to an embodiment, the electrochemical cell additionally comprises
- at least one negative electrode comprising an active material selected from the group consisting of carbon, tin, silicon, lithium and indium;
- at least one positive electrode comprising an active material selected from the group consisting of lithiated transition metal oxides and sulfur compounds.

According to an embodiment, the active material of the negative electrode is selected from the group consisting of lithium and indium and the active material of the positive electrode is selected from the group consisting of S, $TiS_2$, $TiS_3$, $TiS_4$, NiS, $NiS_2$, CuS, $FeS_2$, $Li_2S$, $MoS_3$, polyacrylonitriles-sulfur, dithiooxamide and disulfur compounds.

The invention also relates to a process for manufacturing a solid electrolyte electrochemical cell, said process comprising the steps of:

a) preparing a mixture containing a positive electrochemically active material and optionally the compound as described above;

b) depositing on the mixture obtained in step a) a layer of the compound as described above to form a solid electrolyte;

c) depositing at least one layer of a mixture containing a negative electrochemically active material and optionally the compound as described above on a free side of the compound layer forming the solid electrolyte.

Finally, the invention also relates to the use of a boron-containing anion as a substituent for a halide ion in a compound of formula $Li_{7-x}PS_{6-x}X_x$ where X is selected from the group consisting of Cl, Br, I, F and CN and $0<x\leq2$, to increase the ionic conductivity of this compound.

"Li" and "In" refer to the lithium layer and the indium layer, respectively.

"SE" refers to the solid electrolyte layer.

"Positive" means the layer containing the positive active material.

Figure 2:
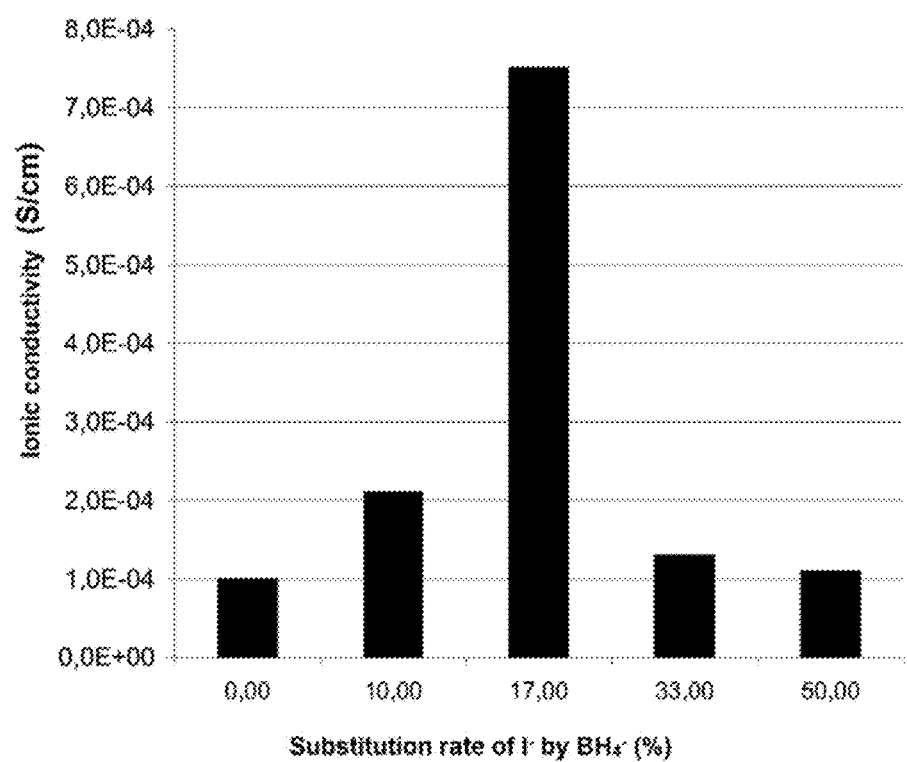

FIG. 2 shows the ionic conductivity of compounds of formula $Li_{7-x}PS_{6-x}I_{x-z}(BH_4)$, for different values of the degree of substitution of the halide ion $I^-$ by the borohydride ion: 0%, 10%, 17%, 33% and 50%.

Figure 3:
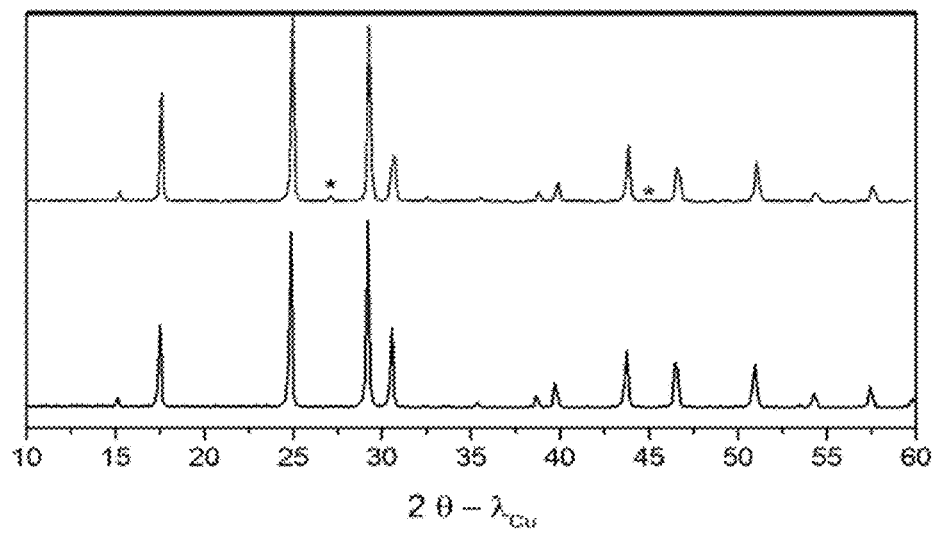

FIG. 3 shows two X-ray diffraction spectra. The top spectrum is obtained with the compound in Example 2. The bottom spectrum is obtained with the compound from Reference Example 1.

Figure 4:
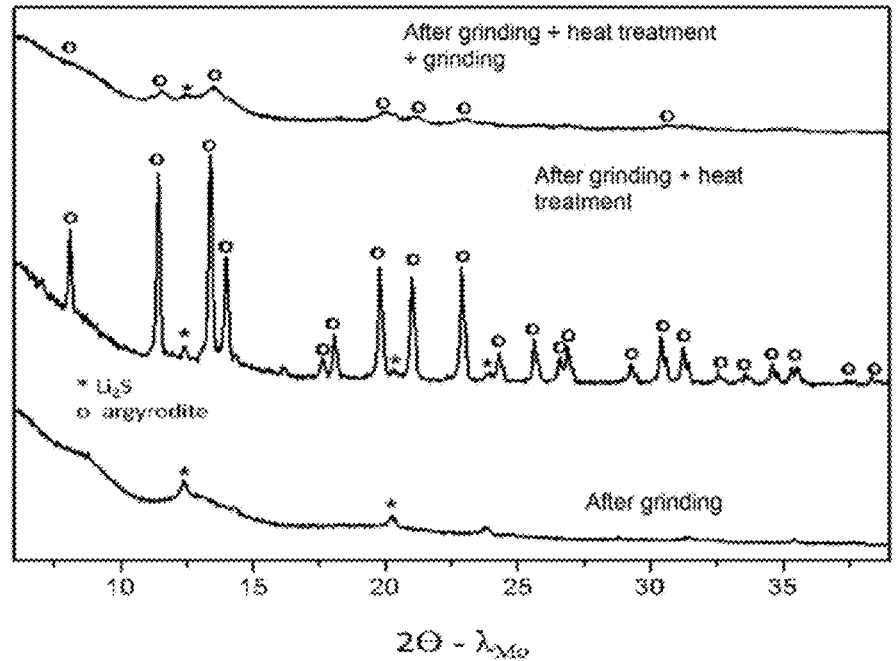

FIG. 4 shows the X-ray diffraction spectra of samples A, B and C described in the experimental section. The lower spectrum is obtained from sample A. The spectrum of the medium is obtained from sample B. The top spectrum is obtained from sample C.

Figure 5:
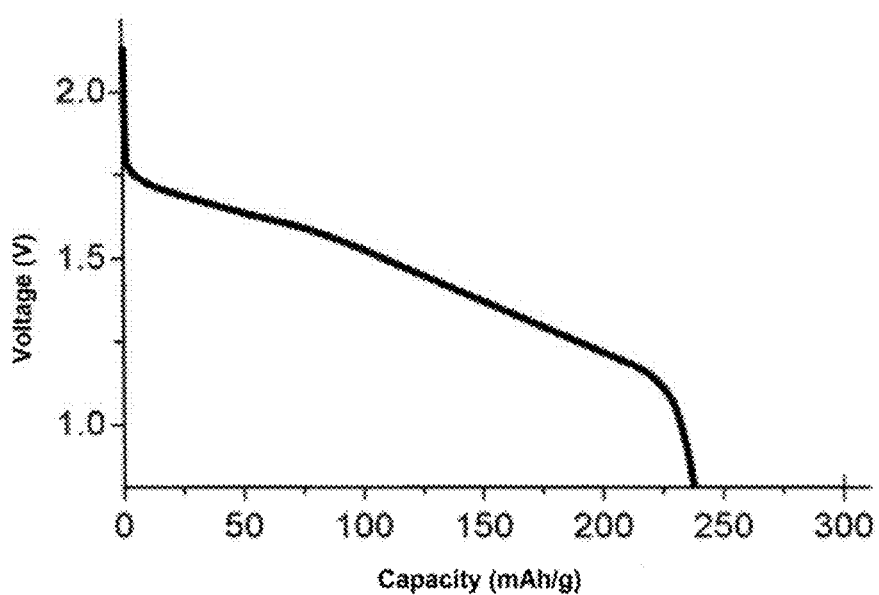

FIG. 5 shows the discharge curve at room temperature at regime C/20 of a lithium-ion electrochemical cell comprising a solid electrolyte of formula $Li_6PS_5Cl_{0.83}(BH_4)_{0.17}$.

DISCLOSURE OF EMBODIMENTS

The compound according to the invention has the formula $Li_{7-x}PS_{6-x}X_{x-z}(BH_4)_z$ wherein:

X is selected from the group consisting of Cl, Br, I, F and CN $0<x\leq2$ $0<z\leq0.50$.

Preferably, element X is I or Cl.

This compound is characterized by a substitution of part of the halide ion $X^-$ by the borohydride ion $BH_4^-$. This substitution has the effect of increasing the ionic conductivity compared with that of the unsubstituted $Li_{7-x}PS_{6-x}X_x$ compound.

In an embodiment, x is greater than or equal to 0.1.

In an embodiment, z is greater than or equal to 0.05.

In an embodiment, z is less than or equal to 0.35.

The Applicant surprisingly observed that the increase in ionic conductivity was greatest when the substitution rate was in the range of 10 to 20% ($0.1\leq z\leq0.20$), preferably in the range of 15 to 20% ($0.15\leq z\leq0.20$). The ionic conductivity can be multiplied by seven thanks to this substitution.

It was also observed that the increase in ionic conductivity was more pronounced when the compound was in an amorphous state. The advantages of an amorphous structure are isotropic conductivity, ease of fabrication in dense thin films. The compound can be subjected to a grinding step to increase its amorphous character.

It is preferable not to subject the compound to a heat treatment, such as annealing, as this promotes the appearance of a crystalline structure. The examples in the experimental section illustrate the effect of the degree of crystallinity of the compound on its ionic conductivity.

The compound according to the invention is the result of a chemical reaction between $LiBH_4$ and $Li_2S$, $P_2S_5$ and LiX. The process for preparing the compound according to the invention comprises the steps of:

a) providing a mixture comprising $Li_2S$, $P_2S_5$, $LiBH_4$ and LiX wherein X is selected from the group consisting of Cl, Br, I, F and CN;

b) grinding the mixture for a period of time sufficient to allow the incorporation of $LiBH_4$ into the compound $Li_{7-x}PS_{6-x}X_{x-z}(BH_4)_z$.

It should be noted that according to the invention, the borohydride ions $BH_4^-$ are integrated into the $Li_{7-x}PS_{6-x}X_x$ structure during grinding. The grinding step is therefore carried out as long as lithium borohydride $LiBH_4$ remains in the mixture, i.e. not yet incorporated into $Li_{7-x}PS_{6-x}X_x$. The grinding time depends on the conditions under which the grinding is carried out (number of balls, internal volume of the jar, speed of the mill, quantity of starting mixture, etc.). However, it is easy for the skilled person to determine by routine testing whether lithium borohydride remains in the mixture. The X-ray diffraction technique can be used for this purpose to detect the presence of residual lithium borohydride.

Preferably, the grinding is carried out over a period of at least 10 hours, preferably at least 15 hours, and more preferably at least 20 hours.

The grinding step is usually carried out under inert atmosphere, for example under argon, and under dry atmosphere.

Preferably, the grinding step is conducted at room temperature.

According to the invention, the grinding is carried out in a single operation on a mixture containing all the reagents $Li_2S$, $P_2S_5$, $LiBH_4$ and LiX, unlike the process for manufacturing the solid electrolyte of document JP 2016-134316 wherein the compound $Li_6PS_5X$ is manufactured first, then the solid solution of $LiX$-$LiBH_4$ is manufactured second, and finally the mixture of $Li_6PS_5X$ with $LiX$-$LiBH_4$ is manufactured.

The compound according to the invention can be used as solid electrolyte. The thickness of the solid electrolyte layer can vary between 10 μm and 1 mm.

The compound according to the invention can also be used in mixture with a negative active material of the electrochemical cell and/or in mixture with a positive active material of the electrochemical cell. Preferably, the compound according to the invention used in mixture with the negative active material or with the positive active material is identical to the compound used as solid electrolyte.

The positive active material may be selected from the group consisting of:
- a sulfur-containing compound i) selected for example from S, $TiS_2$, $TiS_3$, $TiS_4$, $MoS_2$, $MoS_3$, FeS, $FeS_2$, CuS, NiS, $NiS_2$, $Ni_3S_2$, $Li_2S$;
- a compound ii) of formula $Li_xMn_{1-y-z}M'_yM''_zPO_4$ (LMP), wherein M' and M'' are different from each other and are selected from the group consisting of B, Mg, Al, Si, Ca, Ti, V, Cr, Fe, Co, Ni, Cu, Mn, Zn, Y, Zr, Nb and Mo, with $0.8 \leq x \leq 1.2$; $0 \leq y \leq 0.6$; $0 \leq z \leq 0.2$;
- compound iii) of formula $Li_xM_{2-x-y-z-w}M'_yM''_zM'''_wO_2$ (LMO2), wherein M, M', M'' and M''' are selected from the group consisting of B, Mg, Al, Si, Ca, Ti, V, Cr, Mn, Fe, Co, Ni, Cu, Zn, Y, Zr, Nb and Mo, provided that M or M' or M'' or M''' is selected from Mn, Co, Ni, or Fe; M, M', M'' and M''' being different from each other; with $0.8 \leq x \leq 1.4$; $0 \leq y \leq 0.5$; $0 \leq z \leq 0.5$; $0 \leq w \leq 0.2$ and $x+y+z+w \leq 2$;
- compound iv) of formula $Li_xMn_{2-y-z}M'_yM''_zO_4$ (LMO), wherein M' and M'' are selected from the group consisting of B, Mg, Al, Si, Ca, Ti, V, Cr, Fe, Co, Ni, Cu, Zn, Y, Zr, Nb and Mo; M' and M'' being different from each other, and $1 \leq x \leq 1.4$; $0 \leq y \leq 0.6$; $0 \leq z \leq 0.2$;
- compound v) of formula $Li_xFe_{1-y}M_yPO_4$ wherein M is selected from the group consisting of B, Mg, Al, Si, Ca, Ti, V, Cr, Mn, Co, Ni, Cu, Zn, Y, Zr, Nb and Mo; and $0.8 \leq x \leq 1.2$; $0 \leq y \leq 0.6$;
- compound vi) of formula $xLi_2MnO_3$; $(1-x)LiMO_2$ where M is selected from Ni, Co and Mn and $x \leq 1$;

and a mixture of these compounds.

The negative active material may be selected from the group consisting of:
i) a carbon-based compound, such as graphite;
ii) a lithium oxide of titanium, such as $Li_4Ti_5O_{12}$;
iii) a metal selected from lithium, indium, aluminum, silicon, tin and alloys containing these metals, preferably an alloy of lithium and indium.

One or more binders may be added to the mixture containing the positive active material and the compound according to the invention. This binder may be selected from the group consisting of polytetrafluoroethylene (PTFE), polyvinylidene fluoride (PVDF), ethylene-propylene-diene rubber (EPDM), styrene-butadiene rubber (SBR), polyvinyl alcohol, carboxymethylcellulose (CMC). Likewise, one or more binders may be added to the mixture containing the negative active material and the compound according to the invention. These binders may be the same as those chosen for the positive active material.

A good electronically conductive compound, such as carbon, may also be added to the mixture containing the positive active material and the compound according to the invention or be added to the mixture containing the negative active material and the compound according to the invention.

The mixture containing the positive active substance and optionally one or more binders as well as the electronically conductive compound can be deposited on a current collector to form a positive electrode. Likewise, the mixture containing the negative active material and optionally one or more binders as well as the electronically conductive compound can be deposited on a current collector to form a negative electrode.

An "all-solid" electrochemical cell is obtained by superimposing at least one positive electrode, the solid electrolyte comprising the compound according to the invention and at least one negative electrode. The assembly can be obtained by compression.

EXAMPLES

Different argyrodite type compounds were synthesized. Their composition is shown in Table 1 below.

TABLE 1

| | Compositions tested | | | |
|---|---|---|---|---|
| Example | Composition | x | z | X |
| Reference 1 | $Li_6PS_5I$ | 1.00 | 0.00 | I |
| Ex. 1 | $Li_6PS_5I_{0.90}(BH_4)_{0.10}$ | 1.00 | 0.10 | I |
| Ex. 2 | $Li_6PS_5I_{0.83}(BH_4)_{0.17}$ | 1.00 | 0.17 | I |
| Ex. 3 | $Li_6PS_5I_{0.67}(BH_4)_{0.33}$ | 1.00 | 0.33 | I |
| Ex. 4 | $Li_6PS_5I_{0.50}(BH_4)_{0.50}$ | 1.00 | 0.50 | I |
| Reference 2 | $Li_6PS_5Cl$ | 1.00 | 0.00 | Cl |
| Ex. 5 | $Li_6PS_5Cl_{0.83}(BH_4)_{0.17}$ | 1.00 | 0.20 | Cl |

By way of counter-example, a mixture comprising 83 mol % $Li_6PS_5I$ and 17 mol % $LiBH_4$ was prepared.

For the examples, the compounds are prepared by mechanosynthesis, i.e. high-energy mechanochemical grinding. The powders of the initial reagents $Li_2S$ (Sigma Aldrich, 99.98%), $P_2S_5$ (Sigma Aldrich, 98%), $LiBH_4$ (Rockwood Lithium, 97.8%), LiCl and LiI (Sigma Aldrich 99.99%) are mixed in stoichiometric quantities. For each synthesis, 1 g of mixture is placed in a 45 cm³ stainless steel jar. 25 balls of 7 mm diameter are also placed in the jar. The latter is tightly closed under argon in glove box. The equipment used for grinding is a Fritsch™ Pulverisette 7 planetary mill. The grinding time of the compounds according to the invention is 20 hours at the rotational speed of 600 rpm. These grinding conditions allow the chemical reaction between the different constituents to take place.

For the counter-example, the compound $Li_6PS_5I$ is prepared as described above and then mixed in stoichiometric proportions with $LiBH_4$ for 10 min at a rate of 300 rpm. These grinding conditions do not allow the substitution of part of $I^-$ by $BH_4^-$.

When the samples undergo heat treatment, this consists of heating them to 550° C. for 5 hours in a sealed autoclave. This heat treatment causes recrystallization of the compound.

X-ray diffraction analyses are performed on a Bruker™ D8 Advanced diffractometer using the Kα line of copper or molybdenum. A waterproof protection allows the analysis to be carried out under argon atmosphere.

Ion conductivity measurements are performed on pellets made from solid electrolyte powder. The preparation of pellets consists of pressing solid electrolyte powder into a pellet mold under a pressure of 2 tons. The diameter of the pellet is 7 mm. The prepared electrolyte pellet is then inserted between two lithium metal discs and placed in a Swagelok™ type electrochemical cell. Conductivity measurements are carried out using an Autolab™ PGSTAT30 type potentiostat using a sinusoidal voltage of variable frequency between 1 Hz and 1 MHz and an amplitude of 10 mV.

Assembly of the Electrochemical Cells:

The "all-solid" electrochemical cell is obtained by pressing three layers:
- the first consists of a mixture containing the positive active material and the solid electrolyte,
- the second consists of solid electrolyte only (this layer acts as a separator), and
- the third consists of a negative electrode based on lithium and indium.

Preparation of the Mixture Containing the Positive Active Material:

The positive active material used is titanium sulfide, $TiS_2$. Its theoretical capacity is 239 mAh/g. This is mixed manually with solid electrolyte powder in an agate mortar in a glove box. As the $TiS_2$ compound is electronically conductive, the addition of conductive carbon is not necessary. The percentage of solid electrolyte in the mixture is 60%.

Preparation of the Li—In Negative Electrode:

This consists of a 200 μm layer of lithium metal on which a 100 μm layer of indium is deposited.

Figure 1:
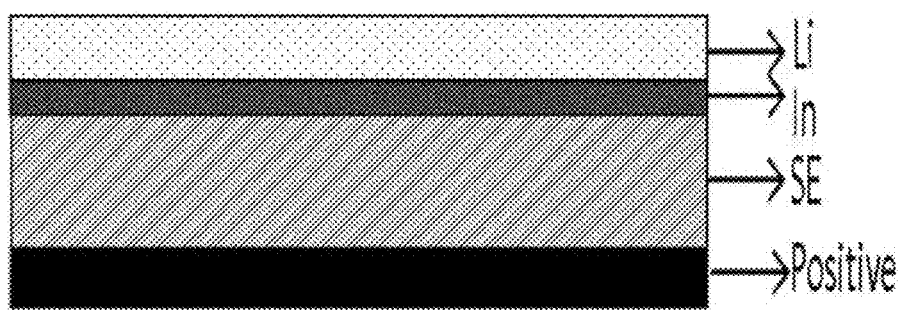
FIG. 1 schematically represents the structure of a lithium-ion electrochemical cell as manufactured in the examples.

Assembly Step:

A thin layer of mixture containing the positive active material is placed in a 9 mm diameter mold. A layer of solid electrolyte is then deposited. A pressure of 2 tons is exerted by means of a press. A pellet is thus obtained. On the electrolyte layer, the indium foil is then deposited followed by the lithium foil. The assembly is tested in a Swagelok™ type electrochemical cell. The structure of the resulting electrochemical cell is shown schematically in FIG. 1.

Results:

Table 2 below shows the results of the ion conductivity measurements. The results obtained for iodide-containing compounds (Reference Examples 1 and Examples 1 to 4) are shown graphically in FIG. 2. These results show that for a substitution rate of 10, 17, 33 and 50%, the ionic conductivity of the compound is increased.

TABLE 2

Result of ion conductivity measurements (S/cm)

| Example | Compound | Ion conductivity at room temperature (S/cm) | % increase in conductivity compared with the un-substituted compound |
| --- | --- | --- | --- |
| Reference 1 | $Li_6PS_5I$ | $1.0 \times 10^{-4}$ | 0 |
| Ex. 1 | $Li_6PS_5I_{0.90}(BH_4)_{0.10}$ | $2.1 \times 10^{-4}$ | 110 |
| Ex. 2 | $Li_6PS_5I_{0.83}(BH_4)_{0.17}$ | $7.5 \times 10^{-4}$ | 650 |
| Ex. 3 | $Li_6PS_5I_{0.67}(BH_4)_{0.33}$ | $1.3 \times 10^{-4}$ | 30 |
| Ex. 4 | $Li_6PS_5I_{0.50}(BH_4)_{0.50}$ | $1.1 \times 10^{-4}$ | 10 |
| Reference 2 | $Li_6PS_5Cl$ | $1.5 \times 10^{-5}$ | 0 |
| Ex. 5 | $Li_6PS_5Cl_{0.83}(BH_4)_{0.17}$ | $6.5 \times 10^{-5}$ | 333 |
| Counter-example | 83% $Li_6PS_5I$ + 17% $LiBH_4$ | $8 \times 10^{-5}$ | −20 |

For the $Li_6PS_5I_{1-z}(BH_4)_z$ family of compounds, it can be seen that the ion conductivity shows a maximum as a function of the rate of substitution of the $I^-$ ion by the $BH_4^-$ ion. The optimal value of the substitution rate is between 10% and 33%, and close to 17%.

The increase in ionic conductivity is also observed when element X is chlorine. The compound in Example 5 has an ionic conductivity of $6.5 \times 10^{-5}$ S/cm while the compound in Reference Example 2 has an ionic conductivity of only $1.5 \times 10^{-5}$ S/cm. The substitution of 17% of the $Cl^-$ ions by $BH_4^-$ ions tripled the ion conductivity.

These results were compared with the results obtained for the counter-example which was prepared by simply mixing the two compounds $Li_6PS_5I$ and $LiBH_4$. In this case, the conductivity of the mixture is lower than that of the $Li_6PS_5I$ compound alone.

In order to demonstrate that the $BH_4^-$ ion is incorporated into the structure of the compound $Li_6PS_5I$, an X-ray diffraction pattern was performed on the compound in Example 2 and on the compound in Reference Example 1. Both compounds were subjected to a heat treatment in order to increase their crystallinity. FIG. 3 compares the spectrum of the compound in Example 2 wherein 17% iodide was replaced by the $BH_4^-$ ion with that of the compound in Reference Example 1.

The spectrum of the compound in Reference Example 1 (bottom spectrum) shows peaks attributable to the presence of the argyrodite phase of cubic structure.

The spectrum of the compound in Example 2 (upper spectrum) differs from that of Reference Example 1 primarily in that it shows low intensity peaks due to a small amount of unreacted $Li_2S$ used as a reactant in the starting mixture. Peaks attributable to $Li_2S$ are marked with asterisks (*). This spectrum also shows the absence of the $LiBH_4$ phase, which proves that the borohydride ion has integrated into the crystallographic structure of the compound $Li_6PS_5I_{0.83}(BH_4)_{0.17}$ during mechanosynthesis.

Study of the Influence of the Degree of Crystallinity of the Compound on the Ionic Conductivity of the Compound $Li_6PS_5I_{0.83}(BH_4)_{0.17}$ (Example 2):

A sample A was prepared. It is produced by grinding the mixture of reagents $Li_2S$, $P_2S_5$, $LiI$ and $LiBH_4$ for 20 hours at a rotational speed of 600 rpm in the Fritsch Pulverisette 7 planetary mill under the conditions described above. Grinding led to the formation of the compound in Example 2. An X-ray diffraction spectrum was performed on this sample A. This spectrum is shown in FIG. 4 (bottom spectrum).

Sample A was then heat treated at 550° C. for 5 hours in a sealed autoclave to induce crystallization. A sample B is thus obtained. An X-ray diffraction spectrum was performed on this sample B. This spectrum is shown in FIG. 4 (middle spectrum).

Sample B was then subjected to grinding to reduce its crystallinity. A sample C was thus obtained. An X-ray diffraction spectrum was performed on this sample C. This spectrum is shown in FIG. 4 (top spectrum).

The spectrum of sample A shows only low intensity peaks corresponding to the presence of the $Li_2S$ phase.

The spectrum of sample B shows the low intensity peaks attributable to the presence of the $Li_2S$ phase as well as well-defined high intensity peaks attributable to crystalline $Li_6PS_5I_{0.83}(BH_4)_{0.17}$.

The spectrum of sample C shows that the $Li_2S$ phase has almost disappeared. The peaks attributable to $Li_6PS_5I_{0.83}(BH_4)_{0.17}$ decreased markedly in intensity, indicating that the grinding step has rendered amorphous a significant amount of $Li_6PS_5I_{0.83}(BH_4)_{0.17}$.

The ion conductivity of samples A, B and C was measured. The ion conductivity values are shown in Table 4:

TABLE 4

Effect of crystallinity on the conductivity of the compound $Li_6PS_5I_{0.83}(BH_4)_{0.17}$

| Sample | Synthesis conditions | Crystalline state | Width at half-height of the peak located at an angle of 20°(*) | Conductivity at room temperature (S/cm) |
|---|---|---|---|---|
| A | ground | amorphous | — | $7.5 \times 10^{-4}$ |
| B | ground and then heat-treated | cubic structure thin lines | 0.2° | $8 \times 10^{-6}$ |
| C | ground then heat treated then ground | cubic structure broad lines | 0.8° | $9 \times 10^{-5}$ |

(*)the angle is measured using the wavelength of molybdenum

Measurements show that the highest ionic conductivity is obtained for the amorphous sample A. Conversely, the lowest ionic conductivity is obtained for sample B wherein $Li_6PS_5I_{0.83}(BH_4)_{0.17}$ is well crystallized. An intermediate conductivity value is observed for the sample C which has an intermediate degree of crystallinity between the amorphous and crystalline state.

The use of the compound according to the invention as solid electrolyte makes it possible to reduce the voltage drop induced by the resistance of the separator. The following calculation demonstrates this advantage. In a lithium-ion electrochemical cell with an electrode surface capacity of 4 mAh/cm² and a 25 μm thick separator layer consisting of the compound of Reference Example 1 ($Li_6PS_5I$), the voltage drop induced by the separator during a discharge at regime 10C is about 1 V according to the equations R=1/σ. e/S with
R: separator resistance (Ohm),
σ: electrolyte conductivity (S/m),
e: separator thickness (m),
S: separator surface area (m²) and the voltage drop across the separator is equal to ΔU=R×I, where I is the current flowing through the separator. This voltage drop is very significant because it represents 27% of the open circuit voltage of a lithium-ion electrochemical cell comprising a positive electrode whose active material would consist of a lithium oxide of nickel, cobalt and aluminum (NCA) and comprising a negative electrode whose active material would consist of graphite. Indeed, the open circuit voltage of such a cell is of the order of 3.6 V. This voltage drop decreases to 0.13 V when the separator consists of the compound from Example 2: $Li_6PS_5I_{0.83}(BH_4)_{0.17}$ This value of 0.13 V is quite acceptable as it represents only 3.6% of the open circuit voltage. Reducing this voltage drop allows the lithium-ion electrochemical cell to deliver a higher voltage for a given discharge regime.

TABLE 3

Comparison between the voltage drop induced by a separator comprising the Reference Compound 1 and the voltage drop induced by a separator comprising the compound $Li_6PS_5I_{0.83}(BH_4)_{0.17}$ of Example 2.

| | conductivity (S/cm) | separator resistance (ohm · cm²) | voltage drop due to the separator (V) |
|---|---|---|---|
| Reference Example 1 $Li_6PS_5I$ | $1.0 \times 10^{-4}$ | 25 | 1 |
| Example 2 $Li_6PS_5I_{0.83}(BH_4)_{0.17}$ | $7.5 \times 10^{-4}$ | 3.33 | 0.13 |

For information purposes, FIG. 5 shows the discharge curve at regime C/20 at room temperature of an electrochemical cell comprising:
a $TiS_2$-based positive active material;
a solid electrolyte consisting of the compound $Li_6PS_5Cl_{0.83}(BH_4)_{0.17}$;
a negative active material based on indium and lithium.

The mass capacity value measured in discharge at C/20 is 238 mAh/g. It is almost equal to the theoretical capacity of $TiS_2$ (239 mAh/g), which shows that the electrolyte works very well at room temperature.

The invention claimed is:

1. A crystalline compound of formula $Li_{7-x}PS_{6-x}X_{x-z}(BH_4)_z$ wherein:
   X is selected from the group consisting of Cl, Br, I, F and CN
   0<x≤2
   0<z≤0.50.

2. The crystalline compound as claimed in claim 1, wherein x=1.

3. The crystalline compound as claimed in claim 1, wherein X is I or Cl.

4. The crystalline compound as claimed in claim 1, where 0.1≤z≤0.35.

5. The crystalline compound as claimed in claim 1, where 0.1≤z≤0.20.

6. The crystalline compound as claimed in claim 1, where 0.15≤z≤0.20.

7. A process for preparing a crystalline compound as claimed in claim 1, comprising the steps of:
   a) providing a mixture comprising $Li_2S$, $P_2S_5$, $LiBH_4$ and LiX wherein X is selected from the group consisting of Cl, Br, I, F and CN;
   b) grinding the mixture for a period of at least 10 hours to allow the incorporation of $LiBH_4$ into the compound $Li_{7-x}PS_{6-x}X_{x-z}(BH_4)_z$.

8. The preparation process as claimed in claim 7, wherein the grinding step b) is carried out for a period of at least 15 hours.

9. The preparation process as claimed in claim 8, wherein the grinding step b) is carried out for a period of at least 20 hours.

10. An electrochemical cell comprising a solid electrolyte comprising the crystalline compound as claimed in claim 1.

11. The electrochemical cell as claimed in claim 10, wherein the solid electrolyte does not contain $LiBH_4$.

12. The electrochemical cell as claimed in claim 10, further comprising:
- at least one negative electrode comprising an active material selected from the group consisting of carbon, tin, silicon, lithium and indium;
- at least one positive electrode comprising an active material selected from the group consisting of lithiated transition metal oxides and sulfur compounds.

13. The electrochemical cell as claimed in claim 12, wherein:
- the active material of the negative electrode is selected from the group consisting of lithium and indium;
- the active material of the positive electrode is selected from the group consisting of S, $TiS_2$, $TiS_3$, $TiS_4$, NiS, $NiS_2$, CuS, $FeS_2$, $Li_2S$, $MoS_3$, polyacrylonitriles-sulfur, dithiooxamide and disulfur compounds.

14. A process for manufacturing a solid-electrolyte electrochemical cell, said process comprising the steps of:
- a) preparing a mixture containing a positive electrochemically active material;
- b) depositing on the mixture obtained in step a) a layer of the crystalline compound as claimed in claim 1 to form a solid electrolyte;
- c) application of at least one layer of a mixture containing a negative electrochemically active material on a free side of the compound layer forming the solid electrolyte.

15. A method comprising the step of substituting a boron-containing anion for a halide ion in a crystalline compound of formula $Li_{7-x}PS_{6-x}X_x$ to obtain a crystalline compound of formula $Li_{7-x}PS_{6-x}X_{x-z}(BH4)_z$,
- where $0<z\leq0.50$,
- where X is selected from the group consisting of Cl, Br, I, F and CN and $0<x\leq2$
- in order to increase the ionic conductivity of this compound.

* * * * *